T. H. FIELD.
PIPE THREAD CUTTING MACHINE.
APPLICATION FILED MAY 3, 1917.

1,259,973.

Patented Mar. 19, 1918.
2 SHEETS—SHEET 1.

INVENTOR
Thomas H. Field.
by
Owen, Owen & Crampton

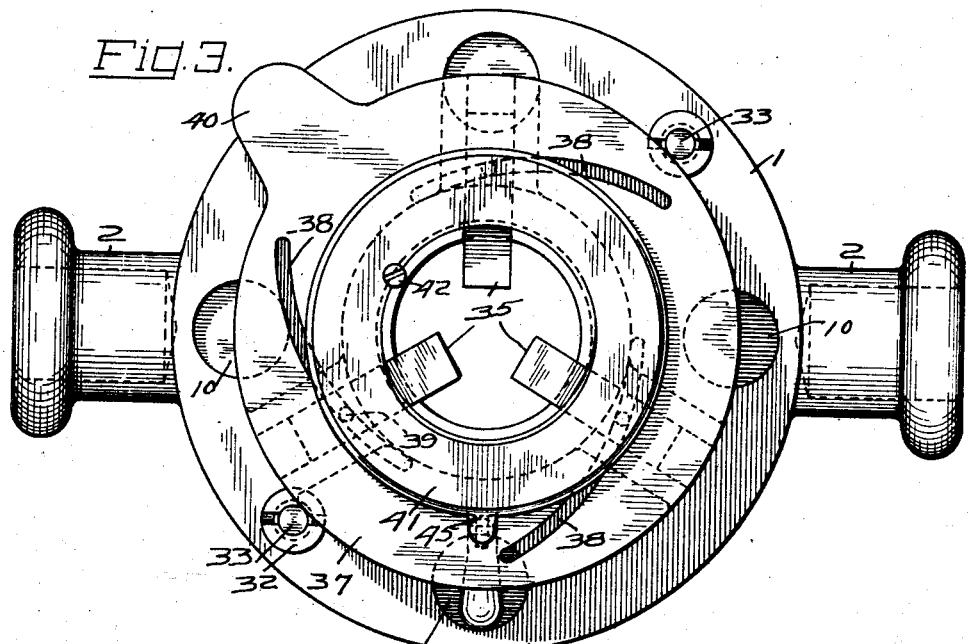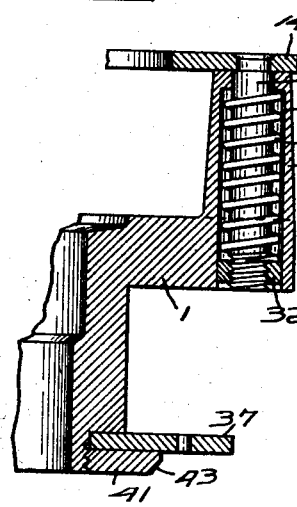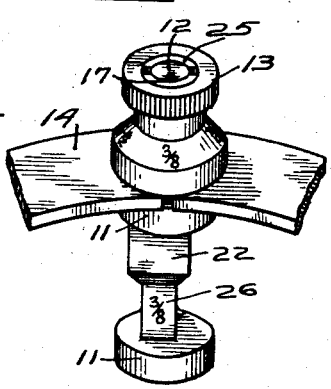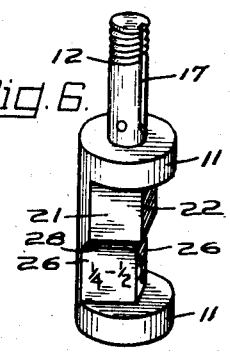

UNITED STATES PATENT OFFICE.

THOMAS H. FIELD, OF ARCHBOLD, OHIO.

PIPE-THREAD-CUTTING MACHINE.

1,259,973.  Specification of Letters Patent.  Patented Mar. 19, 1918.

Application filed May 3, 1917. Serial No. 166,118.

*To all whom it may concern:*

Be it known that I, THOMAS H. FIELD, a citizen of the United States, and a resident of Archbold, in the county of Fulton and State of Ohio, have invented a certain new and useful Pipe-Thread-Cutting Machine; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to a pipe thread cutting machine and it has for its object to produce a simple and efficient machine that will with the same dies, cut pipes of different standard sizes. It also has for its object to provide means for permitting the dies to be withdrawn from the work in order that the machine may be readily removed from the pipe when the thread has been cut. It also has for its object to provide a simple centering means which may be quickly and easily adjusted and which will place the work exactly in the center of the machine and so that axis of the pipe will coincide with the axis of the machine, that is, with the axis of the cutting surfaces or corners of the dies. Means is also provided for locking the centering means. Other features will appear from the following description and the drawings.

Means for accomplishing these different results may be embodied in different forms of construction and the invention may be contained in such modifications. I have selected a construction containing my invention to show how such a construction may be made and to show that the invention is operative.

Figure 1:
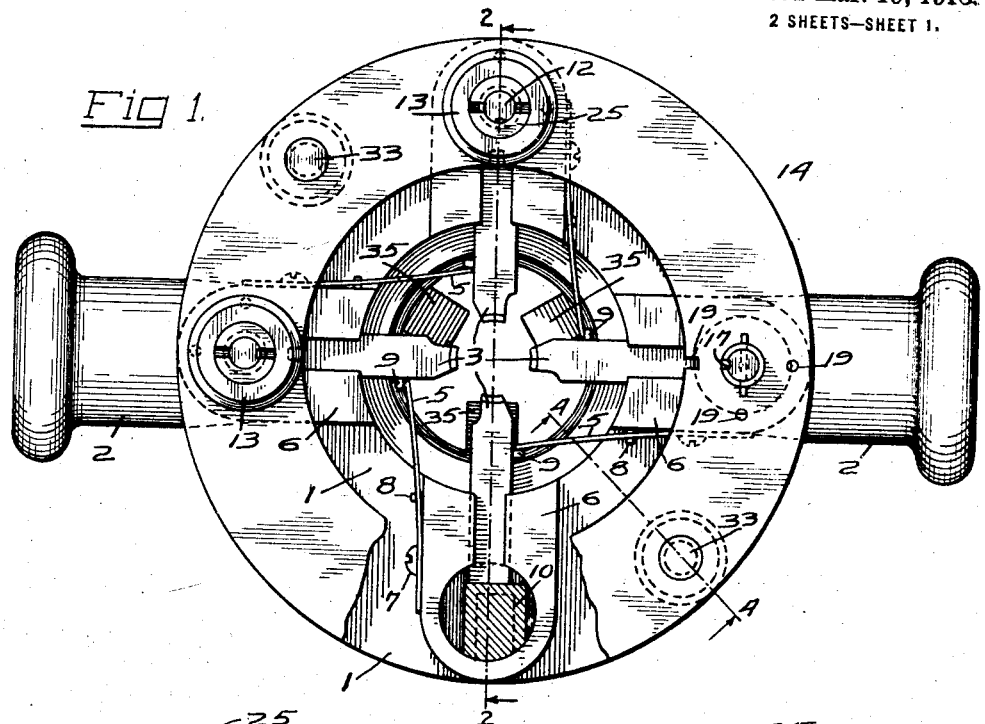
Figure 2:
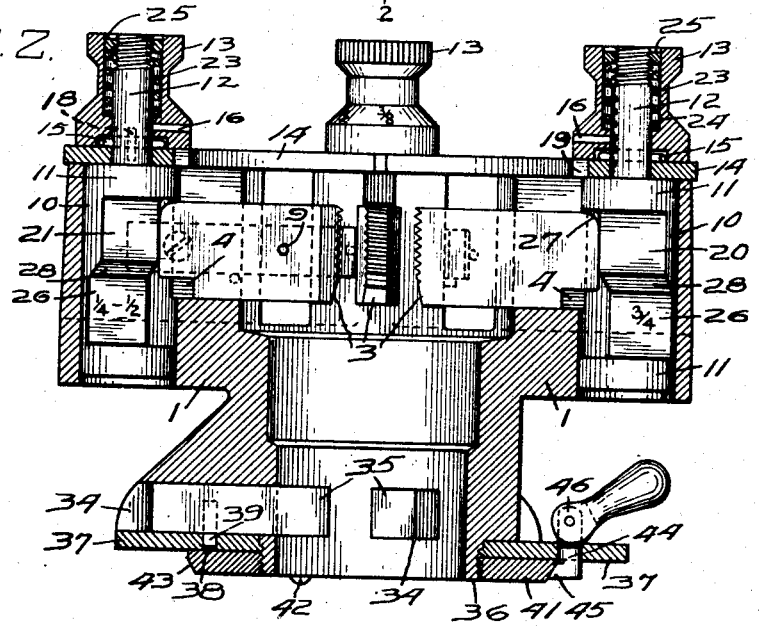

The form of construction selected is illustrated in the accompanying drawing wherein Figure 1 illustrates a top view of the pipe thread cutting machine selected. Fig. 2 illustrates a sectional view taken on the line 2—2 indicated in Fig. 1. Fig. 3 illustrates a bottom view of the device illustrated in Fig. 1. Fig. 4 illustrates a sectional view of a spring operative means for causing the return of the pipe die adjusting means. It illustrates a broken sectional view taken on the line 4—4 indicated in Fig. 1. Fig. 5 illustrates a perspective broken view of the pipe die adjusting means. Fig. 6 shows a side view of the pipe die adjusting means, the handle for rotating the said means being shown removed.

1, Fig. 1, indicates the head in which the parts of the machine are mounted. It is provided with two sockets 2 in which handles or arms may be inserted for rotating the head when it is in position on the work. 3 are pipe thread cutting dies which are movable in channels 4 formed in the head 1. 5 are springs secured to bosses 6 in which the pipe dies 3 are located. The springs 5 are preferably pivoted and are secured to the bosses by means of screws 7 about which the springs may be rotated in vertical planes. The downward movement of the springs is limited by pins 8 which are secured in the bosses. The dies 3 are provided with pins 9 against which the springs 5 operate to push the dies outward away from the work. The dies, however, are held in position and to the work by cam members or posts 10 which are located in the head 1 and in the bosses 6. The posts 10 may be rotated in the head and moved longitudinally in the head. In their rotative and longitudinal movements they are guided by flanges or enlargements 11 to keep them in position relative to the head. They are provided with stems or rods 12 which extend into or through handles 13. They also extend through a ring 14 in which they may be rotated. They are secured to the ring 14 by means of pins 15 which pass through the rods or stems 12 and are covered by the handles 13. The cam members or posts 10 are rotated by the handles 13, the handle 13 being provided with pins 16 which extend into channels, 17, formed in the pins or stems 12. The handles 13 and consequently the cam members 10 are locked in different positions by means of pins or extensions 18 and holes 19 formed in the ring 14 and around the axis of the stem 12.

The cam members or posts 10 are provided with a plurality of surfaces, 20, 21 and 22, which are located at different distances from the axes of the cam members or posts 10 the outer ends of the dies 3 abut the surfaces by the action of the springs 5 which push the dies outward. The surfaces hold the dies in their positions according to the size of pipe to be cut. The corresponding surfaces of the posts 10 are the same distances from the axes of the posts 4 so that the cutting edges or surfaces of the dies will be the same distance from the axis of the head. When the machine is in condition for cutting the thread of any particular pipe, the outer ends of the dies abut corresponding surfaces. When, however, it is desired to change the machine to cut another size pipe the posts are all turned so as to bring the corresponding surfaces of the posts into position such that the outer ends of the dies will abut the said corresponding surfaces. By this means the dies may be changed to cut a thread of a different diameter, that is, their cutting edges will be moved to a different distance from the axes of the head.

In the form of the invention selected, I have shown three such surfaces on each of the posts whereby the dies of the machine selected will cut threads on three different standard sizes of pipe. The handles 13 or the ring 14 may be provided with indexing to indicate the proper positions of the handles when the surfaces of the cam members or posts 10 are in proper position to cut the desired sizes of pipe thread.

In the form of construction shown the handles are marked with the size of pipes and when the sizes marked are placed in a position opposite a marking on the ring, such as toward the center of the ring, the surfaces of the cam members or posts 10 will be in the position relative to the dies to cause the dies to cut the size so marked on the handles and placed in the proper relative positions to the ring 14. The method of indexing may be varied by those skilled in the art without departing from the spirit of the invention. The machine may be made for cutting any set of sizes desired. Also the dies having different lengths may be used. Changing the dies will enable the cutting of thread for another set of sizes of pipes. Also the posts having different recesses may be substituted. In the drawing is shown a machine for cutting threads on $\frac{1}{4}$, $\frac{3}{8}$, $\frac{1}{2}$ and $\frac{3}{4}$ inch pipes. The dies for cutting $\frac{1}{4}$ and $\frac{3}{8}$ inch pipes have 18 teeth per inch and the dies for cutting $\frac{1}{2}$ and $\frac{3}{4}$ pipe have 14 teeth per inch according to standard.

In order to permit movements of each handle 13 relative to the stem 12 to allow the withdrawal of the pin 18 from the holes 19, the pins 16 move in the channels 17. To cause the return of the handle 13 relative to the pins or stems 12, a spring 23 is located in a socket 24 formed in the handle and intermediate a bur or nut 25 and the bottom of the socket 24. The spring 23 operates to hold the post 10 locked in its adjusted position by holding the pin 18 in one or the other of the holes 19.

Below the surfaces 20, 21 and 22 there are located surfaces 26 which are nearer to the axes of the cam members or posts 10 than the surfaces 20, 21 and 22 so that when the ring 14 is lifted which lifts all of the cam members or posts 10, the dies 3 under the action of the springs 5 will be allowed to be pushed away from the work so that the pipe can be withdrawn from the machine or that the machine may be taken off from the end of the pipe. The upper outer corners 27 of the dies are rounded and the surfaces, 20, 21 and 22 are connected to the surfaces 26 by inclined surfaces 28 which frictionally engage the rounded surfaces 27, so that with the help of the springs 5, the cam members or posts 10 together with the interconnecting ring 14 are held in their positions, namely, the positions which permit the dies to be removed from the work. The ring 14 and the cam members or posts 10 are yieldingly drawn toward and into the head 1 by means of the springs 29 located in bosses 30, formed on the head 1 and intermediate the ends of the socket 31 formed in the bosses 30 and the nuts or burs 32 which are threaded on to the ends of the rods 33 that are secured to the ring 14. When the thread has been cut, ring 14 is pulled from the head which permits the dies to recede from the work. The post 10 and the ring 14 are held in the positions to which they are pulled by the inclined surfaces 28 and the rounded corners 27. When the machine has been removed from the pipe the dies may be forced to their thread cutting positions by a smart blow of the hand on the handles 13 which will overcome the frictional engagement between the inclined surfaces 28 and the corners 27. The springs 29 will force the cam members or posts 10 into their normal position relative to the dies and place the dies in thread cutting positions.

The head 1 is provided with a centering means for centering the pipe relative to the dies. The head is provided with square holes 34 in which are located centering blocks 35. The lower end of the head is provided with a flange 36 around which is placed a plate 37 having eccentric slots 38. The centering blocks 35 are provided with pins 39 which extend into the slots 38 so that when the plate 37 is rotated the centering blocks will be pulled in and out of the holes 34 formed in the head 1 and toward the axis of the head. The plate 37 may be provided with a handle 40 for convenience of operation. Plate 41 is threaded on to the flange 36 and operates to secure the plate 37 in position. The plate 41 may be keyed to the flange 36 by means of the screw 42. The plate 41 is provided with a beveled edge 43 while the plate 37 is provided with a pin 44 which extends through the plate 37 and is movable therein. The pin 44 is provided with a nose 45 having a beveled surface which fits the beveled edge 43 of the plate 41. The pin 44 is also provided with a cam member 46 which is pivoted to the pin 44 and which when rotated engages the plate 37 and so as to draw the nose 45 against the beveled edge 43 and lock the plate 37 to the plate 41 and thus lock the plate 37 relative to the head 1. This locks the centering blocks 35 into the position that they may be adjusted by the rotation of the plate 37.

I claim—

1. In a pipe thread cutting machine, the combination of a head, dies located and movable longitudinally in the said head, rotatable cam members having cam surfaces operated on the said dies for setting the dies for cutting thread on different standard sizes of pipes, and movable longitudinally in the said head, means for longitudinally moving the cam members in the said head to remove the dies from the work.

2. In a pipe thread cutting machine the combination of a head, dies longitudinally movable in the said head, rotatable members having cam surfaces located at different distances from the axis of each rotatable member, each of said surfaces adapted to abut the outer end of the said dies to adjust the position of the said dies relative to the axis of the head, the said rotatable members movable longitudinally and having surfaces located below the first named surfaces and located nearer to the axes of the rotatable members and the first named surfaces and the last named surfaces, means for moving the members longitudinally in unison to permit the dies to be withdrawn from the work and to return the dies to their thread cutting positions.

3. In a pipe thread cutting machine the combination of a head, dies longitudinally movable in the said head, rotatable members having surfaces located at different distances from the axes of each rotatable member, each of said surfaces adapted to abut the outer end of the said dies to adjust the position of the said dies relative to the axis of the head, the said rotatable members movable longitudinally and having surfaces located below the first named surfaces and located nearer to the axes of the rotatable members and the first named surfaces to permit the dies to be removed from the work when the rotatable members are moved longitudinally.

4. In a pipe thread cutting machine the combination of a head, dies longitudinally movable in the said head, springs for moving the said dies away from the work, cam members for holding the dies to the work and having a plurality of surfaces for abutting the outer edge of the dies for adjusting the dies to cut different standard sizes of pipe thread, means for connecting the said members together, the said members having recesses which permit the dies to be removed from the work by the action of the springs when the said means is moved to move the said members.

5. In a pipe thread cutting machine the combination of a head, a plurality of dies longitudinally movable in the said head located in the said head, springs operating on the said dies to move the said dies away from the work, rotatable posts, each post having a plurality of surfaces for abutting the outer end of one of the dies and located at different distances from the axis of the posts, means for connecting the posts together, each post having surfaces located below the first named surfaces and nearer the axis of the post than the first named surface to permit the dies to be removed from the same when the said posts are lifted.

6. In a pipe thread cutting machine the combination of a head, dies longitudinally movable in the said head cam members rotatably mounted in the said head, each cam member having surfaces located at different distances from the axis of the cam members for abutting the outer edge of the said dies, each cam member having a spring operated handle for rotating the said cam member and means for locking the said handle and cam member relative to the said head.

7. In a pipe thread cutting machine the combination of a head, dies longitudinally movable in the said head, cam members rotatably mounted in the said head, each cam member having surfaces located at different distances from the axis of the cam members for abutting the outer edge of the said dies, each cam member having a spring operated handle for rotating the said cam member and means for locking the said handle and cam member relative to the said head, index for indicating the position of the said cam member relative to the said head, to indicate the size of pipe that the dies are in position to cut.

In testimony whereof, I have hereunto signed my name to this specification.

THOMAS H. FIELD.

Copies of this patent may be obtained for five cents each, by addressing the "Commissioner of Patents, Washington, D. C."